(12) United States Patent
Wang et al.

(10) Patent No.: US 7,964,678 B2
(45) Date of Patent: Jun. 21, 2011

(54) CATALYST FOR OLEFIN POLYMERIZATION AND PREPARATION THEREOF AND POLYMERIZATION PROCESS

(76) Inventors: Licai Wang, Yingkou (CN); Zhanxian Gao, Dalian (CN); Wei Li, Yingkou (CN); Guotong Zheng, Yingkou (CN); Qingxin Dong, Yingkou (CN); Riping Liu, Dalian (CN); Xiaohuan Wang, Dalian (CN); Nan Zhang, Dalian (CN); Jingzhuang Wang, Yingkou (CN); Shimian Cai, Yingkou (CN)

( * ) Notice: Subject to any disclaimer, the term of this patent is extended or adjusted under 35 U.S.C. 154(b) by 1112 days.

(21) Appl. No.: 11/659,621

(22) PCT Filed: Feb. 24, 2006

(86) PCT No.: PCT/CN2006/000274
§ 371 (c)(1),
(2), (4) Date: Feb. 6, 2007

(87) PCT Pub. No.: WO2006/094445
PCT Pub. Date: Sep. 14, 2006

(65) Prior Publication Data
US 2008/0161513 A1  Jul. 3, 2008

(30) Foreign Application Priority Data
Mar. 7, 2005  (CN) .......................... 2005 1 0045990

(51) Int. Cl.
*C08K 5/06*  (2006.01)

(52) U.S. Cl. .................................................. 526/124.3
(58) Field of Classification Search ................ 526/124.3
See application file for complete search history.

(56) References Cited

U.S. PATENT DOCUMENTS

| 2005/0014631 A1* | 1/2005 | Balbontin et al. ............ 502/118 |
| 2006/0068984 A1* | 3/2006 | Sugano et al. ................ 502/115 |

* cited by examiner

*Primary Examiner* — Ling-Siu Choi
*Assistant Examiner* — Sonya Wright
(74) *Attorney, Agent, or Firm* — Squire, Sanders & Dempsey (US) LLP

(57) ABSTRACT

The catalyst for olefin polymerization contains three components A, B and C. The component A is a solid catalyst containing titanium, magnesium, chlorine element and an internal electron donor, the internal electron donor consists of 1,4-diether [2,2'-dialkoxy-1,1'-biphenyl, 2,2'-dialkoxy-1,1'-binaphthalene, 10,10'-dialkoxy-9,9-biphenanthrene]and organic acid ester or 1,3-diether [9,9-bis(methoxymethyl) fluorine, 2,2-dialky 1-1,3-dimethoxypropane]; the component B is an organoaluminum compound; the component C is external electron donor-organic silicon compound or the 1,4 aromatic diether. The catalyst has high catalytic activity, and can be adjusted in the range from 40,000 to 150,000 gPP/gCat when used in propylene polymerization. The polymer made therefrom has isotactivity of 80 to 99 percent and the molecular weight distribution can be adjusted in a wide range. The invention provides a novel method for preparing the 1,4 aromatic diether.

22 Claims, No Drawings

CATALYST FOR OLEFIN POLYMERIZATION AND PREPARATION THEREOF AND POLYMERIZATION PROCESS

TECHNICAL FIELD

This invention deals with catalysts for olefin polymerization reaction. These catalysts are applicable to the homopolymerization and copolymerization reactions of alfa-olefin such as ethylene, propylene, 1-butene and isobutene.

BACKGROUND ART

Since being invented, Ziegler-Natta catalyst system is developed continuously, which has become the essential aspect of catalyst for industrial olefin polymerization reactions. Currently, almost all industrial polyolefin catalysts are Ziegler-Natta support catalysts, whose development mainly experienced two processes including progress of support preparation technique and development of internal electron donor. As an impetus in development of catalyst for olefin polymerization reaction, internal electron donor has developed from monobasic acid ester such as ethyl benzoate and ethyl paraethoxybenzonate, etc. to dibasic acid esters, e.g. dibutyl phthalate, diisobutyl phthalate and dioctyl phthalate, etc., Catalysts constituted by these electron donors are ones being used extensively at present, but their activities are relatively low. In recent years, some new electron donors are reported such as succinate (CN 1313869A), maleate (EP1395617), glutarate (CN 1306544A) and aromatic acid-2,4-pentadiol ester (CN 1453298 A), etc. The activities of catalysts with these esters as electron donors are enhanced to certain degree, but the enhancement is not obviously. Catalysts prepared with compounds such as 1,3-diether (EP1395617) and especially aromatic 1,3-diether (CN1268957A and CN1141285 A) as electron donors have the currently highest catalyst activates, in which external electron donors can also be omitted, but the relatively narrow molecular weight distribution of polyolefin restricts the application of polyolefin.

SUMMARY OF THE INVENTION

The purpose of this invention is to develop new electron donors and improve performances of catalysts aiming at the defects of catalysts prepared with existing electron donors, so as to make the resultant catalysts for olefin polymerization or copolymerization reaction have relatively good comprehensive performances, and at the same time, certain performances (e.g. catalyst activity and isotacticity and molecular weight distribution of poly-alfa-olefin, etc.) of catalyst can also be adjusted as required.

This invention discloses a class of novel internal electron donor aromatic 1,4-diether having the following structural formula:

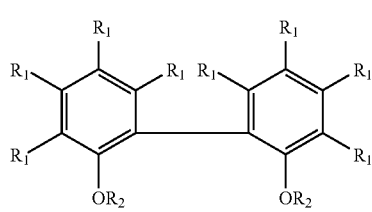

(I)

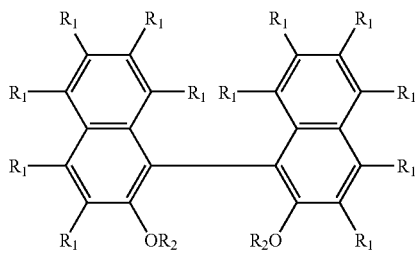

(II)

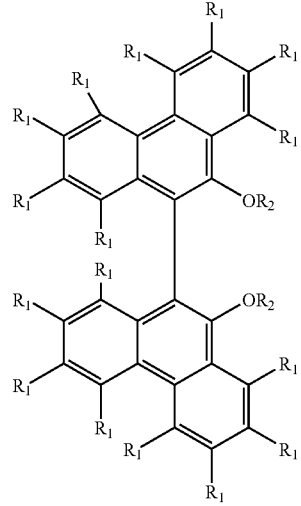

(III)

In the general formulas of (I), (II) and (III) described above:
$R_2$ is a linear or branched alkyl radical containing from 1 to 8 carbon atoms and two $R_2$ groups can be either identical or different;
$R_1$ is hydrogen, halogen, $R_3$ or $OR_3$, and two adjacent $R_3$ can bond mutually to form fused saturated or unsaturated cyclic structure; $R_3$ is selected from the group consisting of linear or branched alkyl radical containing from 1 to 20 carbon atoms, cycloalkyl radical containing from 3 to 20 carbon atoms, aryl radical containing from 6 to 20 carbon atoms and alkaryl or aralkyl radical containing from 7 to 20 carbon atoms; $R_1$ groups can be either identical or different;

The preferred aromatic 1,4-diether is 2,2'-dialkoxy-1,1'-biphenyl (I) or 2,2'-dialkoxy-1,1'-binaphthyl (II);

An environment-friendly novel technological process for preparing electron donor aromatic 1,4-diether (II) is disclosed; multiple methods are used to prepare catalysts for olefins polymerization and copolymerization; the resultant catalysts have relatively high catalytic activity and controllability, and when being used for polymerization of alfa-olefin such as propylene, the activity of catalyst can be adjusted within 40,000~150,000gpp.g$^{-1}$ cat; the isotacticity and molecular weight distribution of polypropylene can also be adjusted in relatively wide ranges; the resultant polypropylene has favorable flowability, relatively high polymer apparent density and favorable form. The resultant catalyst system for olefin polymerization and copolymerization contain three components including: (A) solid catalyst component, (B) cocatalyst, an organoaluminum compound, and (C) the third component, an external electron donor compound. Besides elements of Ti, Mg and Cl, the solid catalyst component (A) also contains two optional combined internal electron donors: the internal electron donor combined by aromatic 1,4-diether and organic acid ester with mol ratio of 0.01~100 and the preferred mol ratio is 0.1~40; the internal electron donor combined by aromatic 1,4-diether and 1,3-diether with mol ratio of 0.01~100 and the preferred mol ratio is 0.1~30; the solid catalyst component (A) can also contain $SiO_2$ and the mol ratio of $SiO_2$ and $MgCl_2$ is 1~20;

The organic acid ester includes monobasic acid ester and dibasic acid ester, in which monobasic acid ester can be ethyl benzoate, butyl benzoate, ethyl methoxybenzoate and ethyl methoxybenzoate, etc.; dibasic acid ester can be diethyl phthalate, dibutyl phthalate, diisobutyl phthalate and dioctyl phthalate, etc., 1,3-diether includes 9,9-bis(methoxymethyl)fluorene and 2,2-dialkyl-1,3-dimethoxy propane with large steric hindrance, such as 2,2-diisopropyl-1,3-dimethoxypropane, 2,2-dibutyl-1,3-dimethoxypropane, 2,2-diisobutyl-1,3-dimethoxypropane, 2,2-ditert-butyl-1,3-dimethoxypropane, 2,2-diisopentyl-1,3-dimethoxypropane, 2,2-ditert-pentyl-1,3-dimethoxypropane, 2,2-diphenyl-1,3-dimethoxypropane and 2,2-dibenzyl-1,3-dimethoxypropane, etc.

The titanium compound for preparing component (A) of catalyst is selected from the group consisting of compound with chemical formula of $Ti(OR')_m X_{4-m}$, wherein R' is an alkyl radical containing from 1 to 8 carbon atoms, X is chlorine and $0 \leq m \leq 4$, and $TiCl_3$. It is more convenient to use titanium tetrachloride and tetraalkoxy titanium. The procedure for preparing the solid catalyst component (A) is as follows: form an alcoholate through reaction of anhydrous magnesium chloride and alcohol at 110~150° C., then make the alcoholate react with titanium compound and internal electron donors at 100~120° C. for 1~2 h; filter the solution and add titanium compound into the solid again to make them react at 100~120° C. for 1~2 h; repeat this procedure for 1 to 3 times; scrub the product with inactive solvent and then obtain the component (A) after vacuum drying; The reaction of alcoholate and titanium compound must be conducted at −10~30° C. The following three methods were approved to be preferred through practice:

One of the methods is as follows: prepare a stable alcoholate through reaction of anhydrous magnesium chloride and alcohol in inactive hydrocarbon solvent at 110~140° C. for 2~5 h in presence of electron donors (or a complex formed by electron donors and titanium compound); add the alcoholate into titanium compound dropwise and make them react at 100-120° C. for 1-2 h in presence of internal electron donors; add the filtered solid into the titanium compound again and make them react at 100-120° C. for 1-2 h for another time; repeat above procedures for 1 to 3 times; scrub the product with inactive solvent and then obtain the solid catalyst component finally after vacuum drying;

The second method is as follows: prepare a stable alcoholate through reaction of anhydrous magnesium chloride and excessive alcohol at 110-140° C.; decrease the temperature and add treated $SiO_2$; raise the temperature to 110~140° C. again and make them continue to react for 1~3 h, and then obtain the support with favorable flowability after vacuum treatment. Add this support into titanium compound and make them react at 100-120° C. for 1-2 h in presence of internal electron donors. Add the filtered solid into the titanium compound again and make them react at 100-120° C. for 1-2 h for another time; repeat above procedures for 1 to 3 times; scrub the resultant product with inactive solvent and then obtain the solid catalyst component finally after vacuum drying.

The third method is as follows: make magnesium chloride react with alcohol in mineral oil at 110~150° C. and the prepared alcoholate is dispersed in the mineral oil; disperse the alcoholate scattering in the mineral oil into liquid drops by high speed dispersion emulsion or other means; spray the liquid drops into low temperature receiving solvent to make emulsion drops solidify into microballoons due to shock cooling. A method to prepare spherical alcoholate was once disclosed in China patent ZL94103454.2. After being scrubbed with inactive solvent and dried in vacuum environment, this spherical alcoholate is added into titanium compound and react for 1-2 h at 100-120° C. in presence of internal electron donors; add the filtered solid into the titanium compound again and make them react at 100-120° C. for 1-2 h for another time; repeat above procedures for 1 to 3 times; scrub the resultant product with inactive solvent and then dry it to obtain the solid catalyst component.

The specific surface area of the solid catalyst component (A) prepared according to the method described above is 100~400 $m^2/g$ and its factor of porosity is 0.4-1.5 $cm^3/g$.

Cocatalyst component (B) is an organoaluminum compound with chemical formula of $R_m AlX_{3-m}$, wherein R is a linear or branched alkyl radical containing from 1 to 8 carbon atoms, X is halogen and $1 \leq m \leq 3$. Using triethyl aluminum and triisobutyl aluminum is convenient.

The third component, an external electron donor compound, can be an organic silicon, ether, ester or heterocyclic compound. The general formula of organic silicon compound is $R^1_a R^2_b Si(OR^3)_c$, where $R^1$ and $R^2$ can be identical or different; $R^1$ and $R^2$ can be alkyl, cycloalkyl or aryl radicals containing from 1 to 18 carbon atoms; $R^3$ is a linear or branched alkyl radical containing from 1 to 4 carbon atoms; a, b and c are integers, $0 \leq a \leq 3$, $0 \leq b \leq 3$, $1 \leq c \leq 3$ and $a+b+c=4$. The concrete examples of organic silicon compound include: dimethyldimethoxysilane, diethyldimethoxysilane, dipropyldimethoxysilane, dibutyldimethoxysilane, diisobutyldimethoxysilane, dicyclopentyldimethoxysilane, dicyclohexyldimethoxysilane, diphenyldimethoxysilane, methyltertbutyldimethoxysilane, methylcyclopentyldimethoxysilane, methylcyclohexyldimethoxysilane, methylphenyldimethoxysilane, methyltrimethoxysilane, ethyltrimethoxysilane, propyltrimethoxysilane isopropyltrimethoxysilane, butyltrimethoxysilane, isobutyltrimethoxysilane, methyltriethoxysilane, ethyltriethoxysilane, propyltriethoxysilane isopropyltriethoxysilane, butyltriethoxysilane, cyclopentyltrimethoxysilane, cyclohexytrimethoxysilane, cyclopentyltriethoxysilane, cyclohexytriethoxysilane, phenyltrimethoxysilane, phenyltriethoxysilane. The other optional external electron donor compound is aromatic 1,4-diether. If the combination of aromatic 1,4-diether and 1,3-diether is employed as the internal electron donor of catalyst used for olefins polymerization, a poly-alfa-olefin with relatively high isotacticity can also be obtained without utilization of external electron donors.

In this invention, a two-step method is adopted to prepare the internal electron donor aromatic 1,4-diether (II). In the first step, use ferric chloride solution to heterogeneously oxidize and couple 2-naphthol or its derivatives into intermediate 2,2'-dihydroxyl-1,1'-binaphthyl or its derivatives; use hydrogen peroxide to oxidize ferrous chloride into ferric chloride, which can be used to oxidize and couple 2-naphthol or its derivatives into 2,2'-dihydroxyl-1,1'-binaphthyl or its derivatives again; the hydrogen peroxide is deoxidized into water, which does not increase the complexity of the system and can continuously supply small amount of iron salt and water lost in the process, and at the time, the oxidant ferric chloride can be recycled. This method not only reserves the advantages of using ferric chloride as oxidant, but also eliminates pollutions of iron salt on environment. In the second step, add the separated intermediate 2,2'-dihydroxyl-1,1'-binaphthyl or its derivatives into alkali solution, hydrocarbon solvent, phase-transfer catalyst and etherification reagent successively to turn it into aromatic 1,4-diether (II) through reaction at 20-90□ by using the phase-transfer catalysis technique of three-phase; filter out the solid and scrub it with hydrocarbon solvent, dilute alkali solution and water successively, and then dry it to obtain solid aromatic 1,4-diether (II). Separate hydrocarbon solvent from the filtrate and cleaning solution, refine the hydrocarbon solvent and recover the solid wastes. The refined hydrocarbon solvent can be recycled. These two steps of reactions constitute a environment-friendly synthesis technique.

The derivatives of 2-naphthol for synthesis of aromatic 1,4-diether (II) is

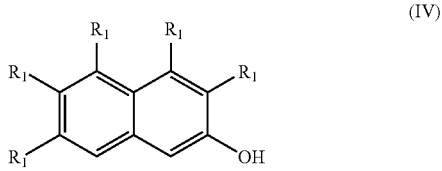

(IV)

In the general formula (IV), $R_1$ is selected from the group consisting of halogen, hydrogen, linear or branched alkyl radical containing from 1 to 16 carbon atoms, cycloalkyl radical containing from 3 to 20 carbon atoms, aryl radical containing from 6 to 20 carbon atoms and alkaryl or aralkyl radical containing from 7 to 20 carbon atoms; R1 groups can be either identical or different.

Its concrete examples are 6-halogen-2-naphthol, 6-methyl-2-naphthol, 6-ethyl-2-naphthol, 6-propyl-2-naphthol, 6-butyl-2-naphthol, 6-isobutyl-2-naphthol, 6-tertbutyl-2-naphthol, 6-hexyl-2-naphthol, 6-octyl-2-naphthol, 6-dodecyl-2-naphthol, 5,6-dimethyl-2-naphthol, 5,6-diethyl-2-naphthol, 5,6-dipropyl-2-naphthol, 5,6-dibutyl-2-naphthol, 5,6-diisobutyl-2-naphthol, 5,6-ditertbutyl-2-naphthol, 5,6-dihexyl-2-naphthol, 5,6-dioctyl-2-naphthol or 5,6-docosyl-2-naphthol.

The alkali solution in the second step of reaction described above is selected from the group consisting of lithium hydroxide, sodium hydroxide, potassium hydroxide, sodium carbonate and potassium carbonate solution;

The hydrocarbon solvent can be benzene, methylbenzene, dimethylbenzene, hexane, heptane, octane, cyclohexane or their mixture; the phase-transfer catalyst is a compound with chemical formula of $R^1R^2R^3R^4N^+X^-$, wherein $R^1$, $R^2$, $R^3$ and $R^4$ can be either identical or different; R in $R^1$, $R^2$, $R^3$ and $R^4$ is selected from the group consisting of linear or branched alkyl radical containing from 1 to 16 carbon atoms, cycloalkyl radical containing from 3 to 16 carbon atoms, aryl radical containing from 6 to 16 carbon atoms and alkaryl or aralkyl radical containing from 7 to 16 carbon atoms; X is selected from the group consisting of chlorine, bromine, iodine and hydrogen sulfate radical; the etherification reagent is selected from the group consisting of dimethyl sulfate, diethyl sulfate, dimethyl carbonate, diethyl carbonate and a compound with chemical formula of RX, wherein R is a linear or branched alkyl radical containing from 1 to 12 carbon atoms and X is selected from the group consisting of chlorine, bromine, iodine and hydroxyl. Olefins polymerization method The olefins polymerization methods in this invention are known slurry polymerization, gas phase polymerization and bulk polymerization. In bulk polymerization, add olefin, cocatalyst organoaluminum compound and the third component external electron donor compound quantitatively into an autoclave firstly, and then add the prepared solid catalyst component into the autoclave according to certain mol ratio (cocatalyst organoaluminum compound/solid catalyst component) (counted as per titanium); after guiding in hydrogen, shut off the fill valve and heat the autoclave; raise the temperature to reaction temperature and maintain an isothermal reaction until the polymerization reaction finishes. After cooling the autoclave temperature to room temperature, separate and dry the polyolefin and then test their physical and chemical properties.

The polymerization reaction in this invention is usually conducted at temperature between 40~150° C. When the polymerization reaction is conducted in gas phase, the operating pressure usually ranges from 1 to 4 MPa. The operating pressure of slurry polymerization usually ranges from 0.1 to 2 Mpa. The operating pressure in bulk polymerization usually ranges from 1 to 5 MPa

EMBODIMENTS OF THE INVENTION

Example 1 a) Preparation of Alcoholate

After the 3-opening bottle with agitator and thermometer is sufficiently swept by nitrogen gas, add 5 g anhydrous magnesium chloride, 30 ml decane and 23 ml 2-ethylhexanol in it. Agitate the reactants while raising the temperature to 130° C., and make them react at this temperature for 2 h. Add 1.5 ml tetrabutyl titanate and 2 ml diisobutyl phthalate into 5 ml methylbenzene in advance, and agitate them at room temperature for 0.5 h to obtain complex solution through the reaction. Add this methylbenzene solution into the 3-opening bottle and maintain the reaction at 130° C. for 1 h. After the reaction finishes, cool the reactants to room temperature to form a stable alcoholate solution.

b) Preparation of solid catalyst component (A)

Sweep a reactor with agitator and thermometer sufficiently by nitrogen gas and add 200 ml titanium tetrachloride into it in advance. Keep it at −20° C. Add the prepared alcoholate solution into the reactor dropwise within 30 min. After all alcoholate solution is added, raise the temperature to 70° C.; add 3.5 mmol 2,2'-dimethoxy-1,1'-binaphthyl and continue to raise the temperature to 110° C.; add 1.2 ml diisobutyl phthalate and maintain the reaction at this temperature for 2 h. After the reaction finishes, filter out the solution and add 200 ml titanium tetrachloride again and maintain the reaction at 110° C. for 1.5 h. After the reaction finishes, filter out the reaction liquid and scrub it with chloroform at 60° C. for 60 min firstly and then with hexane until there are no free chloride ions in the filtrate. Dry the solid product in vacuum environment to obtain the solid catalyst component (A).

Analysis results of solid catalyst component (A):

Content of titanium: 2.36% (wt); specific surface area: 246.85 m²/g; mean grin size: 22.39 μm.

c) Polymerization Reaction

An agitator with rotary speed up to 600 rpm is installed on a 2 L stainless steel autoclave. After the autoclave is sufficiently swept by nitrogen gas, add 1.5 L refined propylene and 4.0 ml hexane solution with triethyl aluminum concentration of 1 mol/L and 0.1 ml CHMMS (cyclohexylmethyldimethoxysilane) in it, and then add 0.00493 mmol solid catalyst component (A) (counted as per Ti) prepared as per step (b). Then raise the temperature to 70° C. and add hydrogen gas with fractional pressure of 0.2 MPa. Maintain the polymerization reaction at this temperature for 1.5 h. After the reaction finishes, guide in cooling water to cool the autoclave to room temperature, stop agitation and discharge unreacted gas to get the reaction product. After vacuum drying, 582 g white polymer is obtained.

Catalyst activity: 58,200 gPP/gcat; apparent density of polymer: 0.45 g/cm$^3$; d50μ710 (mean grain size of polymer is 710μ); isotactic index of polymer: 97.8% (boiling heptane extraction method).

Examples 2-3

In implementations example 2, the dosage of CHMMS in C) polymerization reaction of example 1 is changed from 0.1 ml to 0.2 ml; in implementations example 3, the reactant CHMMS in C) polymerization reaction of example 1 is replaced by 0.1 mmol 2,2'-dimethoxy-1,1'-binaphthyl; other conditions are identical with those of example 1. Their results are listed in Table 1.

TABLE 1

| Example | Content of Titanium/ (wt)% | Catalyst activity/ gPP/gCat | Polymer apparent density/g · cm$^{-3}$ | Isotactic index of polymer/% |
|---|---|---|---|---|
| 2 | 2.36 | 54,500 | 0.45 | 99.2 |
| 3 | 2.36 | 41,000 | 0.43 | 96.1 |

Examples 4-5

Replace diisobutyl phthalate in b) preparation of example 1 with 9,9-bis(methoxymethyl) fluorene and other conditions are identical with those of Example 1. The results are shown in Table 2.

TABLE 2

| Example | 9,9-bis (methoxymethyl) fluorene | Content of Titanium/ (wt) % | Catalyst activity/gPP/gCat | Polymer apparent density/g · cm$^{-3}$ | Isotactic index of polymer/% |
|---|---|---|---|---|---|
| 4 | 1 mmol | 2.34 | 62,000 | 0.45 | 98.2 |
| 5 | 2 mmol | 2.53 | 68,000 | 0.44 | 98.9 |

The molecular weight distribution in example 4 is as follows: Mn 80548, Mw 290065, Mp 161160, Mz 961687 and Mv 246118; the molecular weight distribution index (MWD) is 3.601.

Example 6

Synthesis of Solid Catalyst Component (A)

Successively add 4.8 g MgCl$_2$ and 48 mL n-butyl alcohol into a 3-opening bottle which is sufficiently swept by high-purity nitrogen gas. Begin to raise temperature when agitation is started, and maintain agitation for 1 h at 120° C. until MgCl$_2$ and n-butyl alcohol form a transparent solution; add 2.1 g 2,2'-dimethoxy-1,1'-binaphthyl and maintain the reaction for 1 h at this temperature before starting cooling; when the temperature is reduced to 60° C., add 9.5 g SiO$_2$, and then raise the temperature to 120° C. and react for 1 h; at last, extract out alcohol in vacuum environment to obtain white catalyst support whose mol ratio of alcohol and magnesium is 2.46 and magnesium content is 4.97%.

Add 5 g catalyst support prepared as per the said method into a glass reactor with 100 mL TiCl$_4$ in it at −20° C. and maintain this temperature for 0.5 h; start to raise temperature gradually to 60° C. in 2.5 h; add 0.75 mL ethyl benzoate (EB) into the reactor and raise the temperature gradually to 120° C.; maintain the reaction for 2 h; filter the solution, add 100 mL TiCl$_4$ again, and raise the temperature to 110° C. and react for 1.5 h; filter out the liquid and scrub the filtrate with hexane until there are no free chorine ions in it. Dry the remained solid product in vacuum environment to obtain the solid catalyst component (A), in which the content of Ti is 3.69%.

Conduct a propylene polymerization reaction according to the method in example 1, in which the catalyst activity is 53,000 gPP/gCat, the apparent density of polymer is 0.45 g.cm$^{-3}$ and the isotactic index of polymer is 98.3%.

Example 7

In accordance with the method disclosed in China patent ZL94103454.2, make magnesium chloride and alcohol react in mineral oil at 110-150° C. and the generated alcoholate scatters in the mineral oil; then disperse the alcoholate scattering in the mineral oil by Φ 1.5 mm capillaries into liquid drops; spray the emulsion into low temperature receiving solvent to make emulsion drops solidify into microballoons due to shock cooling; scrub the microballoon alcoholate with inactive solvent and then obtain spherical support after vacuum drying. Sweep a reactor with agitator and thermometer sufficiently by nitrogen gas and add 200 ml titanium tetrachloride into it in advance. Keep it at −20° C., and then add 5 g prepared spherical support into the reactor. Then raise the temperature to 70° C. and add 3.0 mmol 2,2'-dimethoxy-1,1'-binaphthyl; continue to raise the temperature to 110° C. and add 1.0 ml diisobutyl phthalate; maintain the reaction for 2 h at this temperature; after filtering out liquid, add 200 ml titanium tetrachloride again and react for 1.5 h at 110° C. After the reaction finishes, filter out the reaction liquid and scrub it with methyl chloride at 60° C. for 60 min firstly and then with hexane until there are no free chloride ions in the filtrate. Dry the solid product in vacuum environment to obtain the solid catalyst component (A). Its content of Ti is 3.12%.

Conduct a propylene polymerization reaction according to the method in example 1, in which the catalyst activity is 55,000 gPP/gCat, the apparent density of polymer is 0.45 g.cm$^{-3}$ and the isotactic index of polymer is 98.1%. The molecular weight of polymer is as follows: Mn 69915, Mw 371451, Mp 170529, Mz 1827217 and Mv 296669; the molecular weight distribution index is 5.313.

Examples 8-13

Replace diisobutyl phthalate in example 7 with 9,9-bis(methoxymethyl) fluorene and change the dosages of 2,2'-dimethoxy-1,1'-binaphthyl and 9,9-bis(methoxymethyl) fluorene; no external electron donors are added in polymerization; keep other steps unchanged. The results are shown in Table 3.

TABLE 3

| Example | 9,9-bis (methoxymethyl) fluorine g/g support | 2,2'-dimethoxy-1,1'-binaphthyl g/g support | Content of Ti/ (wt) % | Catalyst activity/ gPP/gCat | Polymer apparent density/g · cm$^{-3}$ | Isotactic index of polymer/ % |
|---|---|---|---|---|---|---|
| 8 | 0.20 | 0.08 | 3.24 | 100,000 | 0.43 | 96.96 |
| 9 | 0.20 | 0.10 | 3.04 | 96,000 | 0.42 | 96.22 |
| 10 | 0.12 | 0.20 | 3.66 | 80,000 | 0.40 | 92.07 |
| 11 | 0.10 | 0.20 | 3.60 | 90,000 | 0.42 | 90.19 |
| 12 | 0.08 | 0.20 | 3.92 | 87,000 | 0.40 | 88.41 |
| 13 | 0.06 | 0.20 | 3.72 | 89,600 | 0.41 | 80.94 |

Examples 14-15

In these examples, add external electron donor diphenyldimethoxysilane (DDS) instead of adding no external electron donors in example 9 and keep other steps unchanged. The results are shown in Table 4.

TABLE 4

| Example | 9,9-bis (methoxymethyl) fluorine g/g supportr | 2,2'-dimethoxy-1,1'-binaphthyl g/g support | Content of Ti/ % (wt) | DDS/ ml | Catalyst activity/ gPP/gCat | Polymer apparent density/g · cm$^{-3}$ | Isotactic index of polymer/ % |
|---|---|---|---|---|---|---|---|
| 14 | 0.20 | 0.10 | 3.04 | 01 | 51,000 | 0.40 | 97.10 |
| 15 | 0.20 | 0.10 | 3.04 | 0.2 | 43,000 | 0.40 | 98.20 |

Examples 16-17

In these two examples, replace 2,2'-dimethoxy-1,1'-binaphthyl by 2,2'-diethoxy-1,1'-binaphthyl and 2,2'-dipropoxy-1,1'-binaphthyl respectively and keep other steps unchanged. The results are shown in Table 5.

TABLE 5

| Example | aromatic 1,4-diether | Content of Ti/ (wt) % | Catalyst activity/ gPP/gCat | Polymer apparent density/g · cm$^{-3}$ | Isotactic index of polymer/ % |
|---|---|---|---|---|---|
| 16 | 2,2'-diethoxy-1,1'-binaphthyl | 2.58 | 47,300 | 0.44 | 96.78 |
| 17 | 2,2'-dipropoxy-1,1'-binaphthyl | 2.42 | 41,700 | 0.44 | 96.36 |

Example 18

In this example, replace 2,2'-dimethoxy-1,1'-binaphthyl by 5,5'-ditert-butyl-2,2'-dimethoxy-1,1'-biphenyl and keep other steps unchanged. The resultant catalyst activity is 56,000 gPP/gCat, the apparent density of polymer is 0.45 g/ml and the isotactic index of polypropylene is 98.5%.

Example 19 a) Preparation of 2,2'-dihydroxyl-1,1'-binaphthyl

Add 2 g 2-naphthol, 11.4 g $FeCl_3.6H_2O$ and 100 ml water into a 200 ml beaker and agitate them at 65° C. by water bath; conduct TLC (thin-layer chromatography) track and maintain the reaction for 3 h; filter the solution to get solid 2,2'-dihydroxyl-1,1'-binaphthyl; scrub 2,2'-dihydroxyl-1,1'-binaphthyl with 50 ml water and add the cleaning solution into the filtrate; add 7.5 ml 30% $H_2O_2$ dropwise slowly into the filtrate while agitation and agitate the solution continuously for 10 min; add 2 g 2-naphthol and maintain the reaction at 65° C. while agitation; conduct TLC track until the reaction finishes; filter the solution to obtain 2,2'-dihydroxyl-1,1'-binaphthyl. Repeat these steps and obtain results as shown in Table 6. The HPLC analysis results of the reaction product obtained in the $11^{th}$ time of cycle are: the conversion of 2-naphthol $\geq 98\%$, and the yield of 2,2'-dihydroxyl-1,1'-binaphthyl $\leq 99\%$.

TABLE 6

| Cycle index | Reaction time/h | TLC analysis |
|---|---|---|
| 0 | 3 | Material point disappears |
| 1 | 3 | Material point disappears |
| 2 | 3 | Material point disappears |
| 3 | 3.5 | Material point disappears |
| 4 | 3.5 | Material point disappears |
| 5 | 3.5 | Material point disappears |
| 6 | 3.5 | Material point disappears |
| 7 | 4 | Material point disappears |
| 8 | 4 | Material point disappears |
| 9 | 4 | Material point disappears |
| 10 | 4 | Material point disappears |
| 11 | 4 | Have small amount of materials | b) Preparation of 2,2'-dimethoxy-1,1'-binaphthyl

Prepare a 30% solution with 52 g NaOH at room temperature. Agitate 143 g 2,2'-dihydroxyl-1,1'-binaphthyl prepared as per the said method, 5.2 g tetrabutyl ammonium hydrosulfate and 500 ml methylbenzene, raise the temperature to 70° C. and add 164 g dimethyl sulfate dropwise simultaneously; agitate and react and conduct TLC track; when monoether point disappear, maintain the reaction for a period of time. Cool down and filter the solution; scrub the filter cake with 400 ml methylbenzene and 400 ml 5% NaOH solution successively and then scrub it with water to neutral state; dry it to obtain 2,2'-dimethoxy-1,1'-binaphthyl. The HPLC analysis results are as follows: the conversion of 2,2'-dihydroxyl-1,1'-binaphthyl ≧99%, the purity of 2,2'-dimethoxy-1,1'-binaphthyl ≧98% and the yield of 2,2'-dimethoxy-1,1'-binaphthyl ≧95%. Incorporate the methylbenzene layers and distill and recover the solid wastes. The distilled methylbenzene can be recycled.

Example 20

In this example, replace 2-naphthol in example 19 by 6-tert-butyl-2-naphthol and keep other materials, feed proportioning and operation procedures unchanged, then obtain 2.6 g crystal of 6,6'-ditertbutyl-2,2'-dimethoxy-1,1'-binaphthyl.

Implementations Example 21

Add 2.0 g 2,2'-dihydroxyl-1,1'-binaphthyl, 0.65 g NaOH, small amount of $H_2O$, 20 mL methylbenzene and 0.2 g tetrabutyl ammonium bromide successively into a round bottom flask, and agitate and make them react at room temperature; add 4.0 ml $(CH_3CH_2O)_2SO_2$ dropwise within 20 min; heat the solution and maintain the reaction for 6 h at water bath temperature of 50° C.; cool it down and filter the solution; scrub the filter cake with NaOH solution and water respectively and then dry it. Recrystallize it with ethanol and dry it in vacuum environment and then obtain 2.2 g crystal of 2,2'-diethoxy-1,1'-binaphthyl.

We claim:
1. A catalyst system for olefin polymerization for forming a polyolefin including poly-alpha-olefin, comprising
   a solid catalyst component A, which comprises elements of titanium, magnesium and chlorine and internal electron donors;
   a cocatalyst component B, which comprises an organoaluminum compound having a chemical formula of $R_mAlX_{3-m}$, wherein
      R is a linear or branched alkyl radical containing from 1 to 8 carbon atoms,
      X is halogen, and
      1<m<3; and
   optionally an external electron donor component C; which is capable of adjusting the catalytic activity of the catalyst system in a range between about 40,000 and about 150,000 g PP/g Cat and adjusting the isotactic index and molecular weight distribution index of the poly-alfa-olefin;
   wherein the solid catalyst component A comprises a specific surface area between about 100 m²/g and about 400 m²/g, and a factor of porosity between about 0.4 cm³/g and about 1.5 cm³/g; where the internal electron donors comprises combined internal electron donors comprising an aromatic 1,4-diether and either an organic acid ester or a 1,3-diether in a molar ratio between about 0.01 and about 100; the aromatic 1,4-diether being selected from 2,2'-dialkoxy-1,1'-biphenyl(I), 2,2'-dialkoxy-1,1'-binaphthyl(II) and 10,10'-dialkoxy-9,9'-biphenanthrene (III)

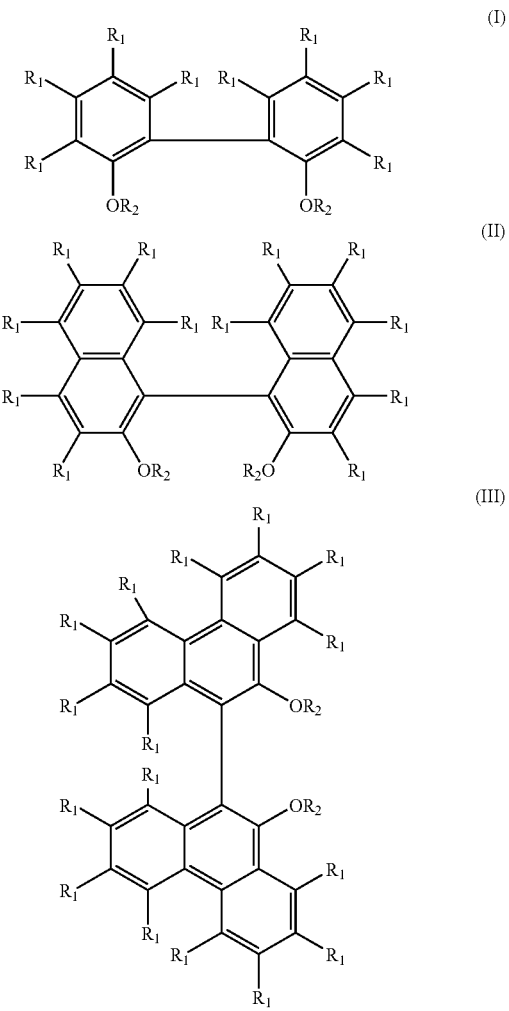

where, in formulae (I), (II) and (III),
   $R_2$ groups are identical or different and are independently a linear or branched alkyl radical comprising from 1 to 8 carbon atoms;
   $R_1$ groups are identical or different and are independently hydrogen, halogen, $R_3$ or $OR_3$ where two adjacent $R_1$ groups optionally form fused saturated or unsaturated cyclic structure;
   $R_3$ is selected from the group consisting of linear or branched alkyl radical containing from 1 to 20 carbon atoms, cycloalkyl radical containing from 3 to 20 carbon atoms, aryl radical containing from 6 to 20 carbon atoms and alkaryl or aralkyl radical containing from 7 to 20 carbon atoms;
   wherein the organic acid ester is monobasic aromatic acid ester or dibasic aromatic acid esters;
   wherein the 1,3-diether is 9,9-bis(methoxymethyl)fluorene or 2,2-dialkyl-1,3-dimethoxypropane having a general formula of $CH_3OCH_2CR_4R_5CH_2OCH_3$ wherein $R_4$ and $R_5$ are identical or different and are independently selected from the group consisting of linear or branched alkyl radical containing from 3 to 16 carbon atoms, cycloalkyl radical containing from 3 to 10 carbon atoms, aryl radical containing from 6 to 20 carbon atoms and alkaryl or aralkyl radical containing from 7 to 20 carbon atoms;

wherein the external electron donor component C comprises an organic silicon compound having a chemical formula of $R^1_a R^2_b Si(OR^3)_c$, wherein $R^1$ and $R^2$ are indentical or different and are independently selected from the group consisting of linear or branched alkyl radical containing from 1 to 10 carbon atoms, cycloalkyl radical containing from 3 to 10 carbon atoms, aryl radical containing from 6 to 20 carbon atoms and alkaryl or aralkyl radical containing from 7 to 20 carbon atoms; $R^3$ is a linear or branched alkyl radical containing from 1 to 6 carbon atoms; and a, b and c are integers, $0<a<3$, $0<b<3, 1<c<3$ and $a+b+c=4$.

2. The catalyst system of claim 1, wherein the aromatic 1,4-diether is 2,2'-dialkoxy -1,1'-biphenyl(I) or 2,2'-dialkoxy-1,1'-binaphthyl(II).

3. The catalyst system of claim 1, wherein the aromatic 1,4-diether is combined with the organic acid ester in a molar ratio ranging from about 0.1 to about 40.

4. The catalyst system of claim 1, wherein the aromatic 1,4-diether is combined with the 1,3-diether in a molar ratio ranging from about 0.1 to about 30.

5. The catalyst system of claim 1, wherein the external electron donor component C is absent when the internal electron donor in the solid catalyst component A is a combination of aromatic 1,4-diether and 1,3-diether.

6. The catalyst system of claim 1, wherein the cocatalyst component B is triethyl aluminum or tri isobutyl aluminum.

7. The catalyst system of claim 1, wherein external electron donor component C is aromatic 1,4-diether.

8. The catalyst system of claim 1, wherein the solid catalyst component A comprises $MgCl_2$ and further $SiO_2$, the molar ratio of $SiO_2$ and $MgCl_2$ being from about 1 to about 20.

9. A method for preparing the catalyst system of claim 1, comprising forming the solid catalyst component A, wherein the solid catalyst component A is formed by a process comprising:

forming an alcoholate through reaction of anhydrous magnesium chloride and alcohol at 110~150° C., allowing the alcoholate to react with a titanium compound by adding the alcoholate at a temperature from about −10 to about −30° C., and then with the internal electron donor at a temperature from about 100 ° C. to about 120° C. for about 1h to 2h;

filtering the solution to yield a solid and adding the titanium compound into the solid to cause them to react at about 100° C. to about 120° C. for about 1h to 2h;

repeating the above acts for 1 to 3 times to generate a raw product;

washing the raw product with an inactive solvent; and vacuum drying to obtain solid catalyst component A.

10. The method of claim 9, wherein the alcoholate is produced by from reaction of anhydrous magnesium chloride and alcohol in an inactive hydrocarbon solvent at a temperature from about 110° C. to 140° C. for about 2h to 5h in the presence of a complex formed by the internal electron donor and the titanium compound.

11. The method of claim 9, wherein the alcoholate is a flowable support including $SiO_2$ formed by preparing a stable alcoholate by allowing anhydrous magnesium chloride and an excess of alcohol to react at a temperature of about 110° C. to about 140° C. to form the stable alcoholate;

decreasing temperature;

adding $SiO_2$;

increasing the temperature to about 110° C. to about 140° C. to cause the stable alcoholate and $SiO_2$ to react for about 1~3h, and vacuum-treating the reaction mixture to obtain the flowable support.

12. The method of claim 9, wherein the alcoholate is solidified microballoons, the alcoholate is formed by reacting anhydrous magnesium chloride and alcohol in mineral oil at a temperature from about 110° C. to about 150° C., dispersing the alcoholate in mineral oil by a dispersion emulsion process to form an emulsion, spraying the emulsion into a low temperature receiving solvent to cause the emulsion to form emulsion drops which are solidified into alcoholate microballoons in the receiving solvent, washing the alcoholate microballoons with a inactive solvent, and vacuum drying the alcoholate microballoons.

13. A method for preparing the catalyst system of claim 1, comprising forming the aromatic 1,4-diether, the aromatic 1,4-diether being one of 2,2'-dialkoxy-1,1'-binaphthyl of formula II and its derivatives, by a two-step process comprising:

(1) using a ferric chloride solution to heterogeneously oxidize and couple 2-naphthol or its derivatives into an intermediate designated as 2,2'-dihydroxyl -1,1'-binaphthyl or its derivatives, and filtering the solution to obtain the intermediate 2,2'-dihydroxyl-1,1'-binaphthyl or its derivatives; and (2) causing the intermediate 2,2'-dihydroxyl-1,1'-binaphthyl or its derivatives to turn into the 2,2'-dialkoxy-1,1'-binaphthyl of formula II and its derivatives by a tri-phase phase-transfer process in presence of an alkali solution, a hydrocarbon solvent, a phase-transfer catalyst and an etherification reagent at 20-90° C., filtering the 2,2'-dialkoxy-1,1'-binaphthyl of formula II and its derivatives, washing the 2,2'-dialkoxy-1,1'-binaphthyl of formula II and its derivatives successively with a hydrocarbon solvent, 5% sodium hydroxide solution and water, drying the 2,2'-dialkoxy-1,1'-binaphthyl of formula II and its derivatives to obtain the 2,2'-dialkoxy-1,1'-binaphthyl or its derivatives;

wherein the hydrocarbon solvent is selected from benzene, methylbenzene, dimethylbenzene, hexane, heptane, octane or cyclohexane;

wherein the phase-transfer catalyst is a compound with a chemical formula of $R^1R^2R^3R^4N^+X-$, where $R^1$, $R^2$, $R^3$ and $R^4$ are identical or different and are independently selected from linear or branched alkyl radical containing from 1 to 16 carbon atoms, cycloalkyl radical containing from 3 to 16 carbon atoms, aryl radical containing from 6 to 20 carbon atoms, or alkaryl or aralkyl radical containing from 7 to 20 carbon atoms, and X is selected from chlorine, bromine, iodine or hydrogen sulfate radical;

wherein the etherification reagent is selected from dimethyl sulfate, diethyl sulfate, dimethyl carbonate, diethyl carbonate, or a compound with chemical formula of RX where R is a linear or branched alkyl radical containing from 1 to 8 carbon atoms and X is chlorine, bromine, iodine or hydroxyl; and wherein the alkali solution is selected from lithium hydroxide, sodium hydroxide, potassium hydroxide, sodium carbonate, or potassium carbonate solutions.

14. The method of claim 13, wherein the 2-naphthol or its derivatives is

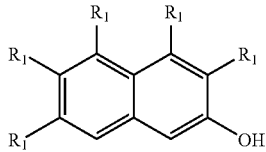

(IV)

wherein $R_1$ groups are identical or different and are independently selected from the group consisting of halogen, hydrogen, linear or branched alkyl radical containing from 1 to 16 carbon atoms, cycloalkyl radical containing from 3 to 20 carbon atoms, aryl radical containing from 6 to 20 carbon atoms, and alkaryl or aralkyl radical containing from 7 to 20 carbon atoms.

15. A method of olefin polymerization, comprising polymerizing an olefin of formula $CH_2\!\!=\!\!CHR$ in the presence of the catalyst system of claim 1 comprising the solid catalyst component A, the cocatalyst component B, and the external electron donor component C,
wherein the molar ratios of solid catalyst component A calculated as per the content of titanium, the cocatalyst component B, and external electron donor component C are:
(B)/(A)=is from about 50 to about 1000; and
(C)/(B)=is from about 0 to about 1;
wherein R is hydrogen or alkyl radical containing from 1 to 8 carbon atoms; and
wherein the olefin polymerization is conducted in liquid phase, slurry or gas phase.

16. The catalyst system of claim 2, wherein the external electron donor component C is absent when the internal electron donor in the solid catalyst component A is a combination of aromatic 1,4-diether and 1,3-diether.

17. The catalyst system of claim 4, wherein the external electron donor component C is absent when the internal electron donor in the solid catalyst component A is a combination of aromatic 1,4-diether and 1,3-diether.

18. The catalyst system of claim 2, wherein the solid catalyst component A comprises $MgCl_2$ and further $SiO_2$, the molar ratio of $SiO_2$ and $MgCl_2$ being from about 1 to about 20.

19. The catalyst system of claim 3, wherein the solid catalyst component A comprises $MgCl_2$ and further $SiO_2$, the molar ratio of $SiO_2$ and $MgCl_2$ being from about 1 to about 20.

20. The catalyst system of claim 4, wherein the solid catalyst component A comprises $MgCl_2$ and further $SiO_2$, the molar ratio of $SiO_2$ and $MgCl_2$ being from about 1 to about 20.

21. The catalyst system of claim 6, wherein the solid catalyst component A comprises $MgCl_2$ and further $SiO_2$, the molar ratio of $SiO_2$ and $MgCl_2$ being from about 1 to about 20.

22. The catalyst system of claim 7, wherein the solid catalyst component A comprises $MgCl_2$ and further $SiO_2$, the molar ratio of $SiO_2$ and $MgCl_2$ being from about 1 to about 20.

* * * * *